(No Model.) 2 Sheets—Sheet 2.
J. E. HARVEY & J. H. HOOVER.
APPARATUS FOR MAINTAINING AND REGULATING VACUUMS IN COW MILKING MACHINES.
No. 547,255. Patented Oct. 1, 1895.
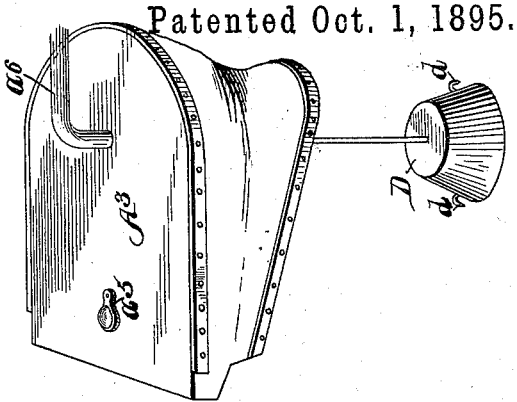
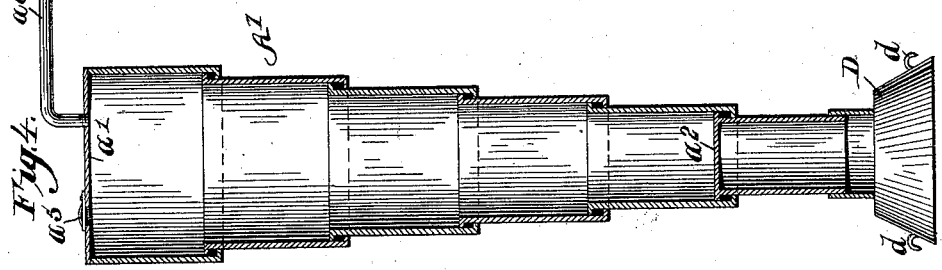
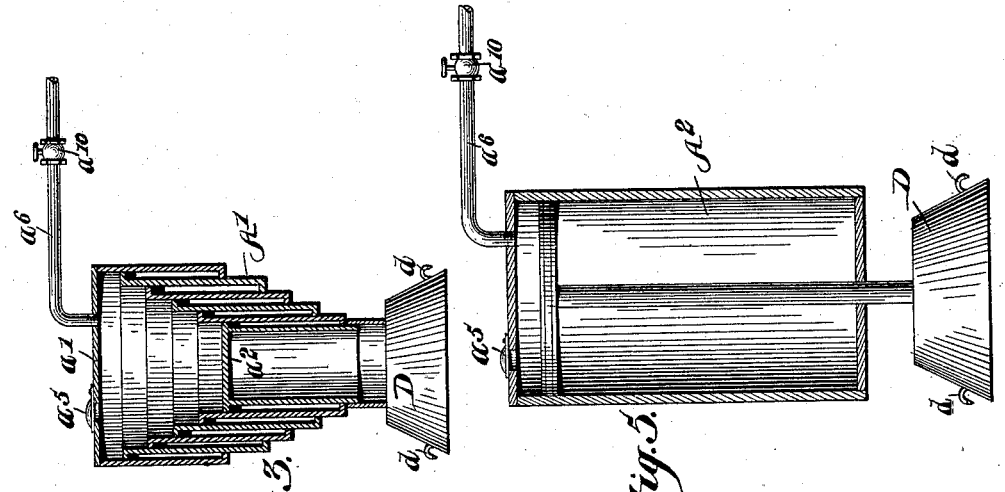
WITNESSES:
Fred G. Dieterich
Amos W. Hart
INVENTORS:
Jerry E. Harvey and
Joseph H. Hoover,
BY Munn & Co.
ATTORNEYS.

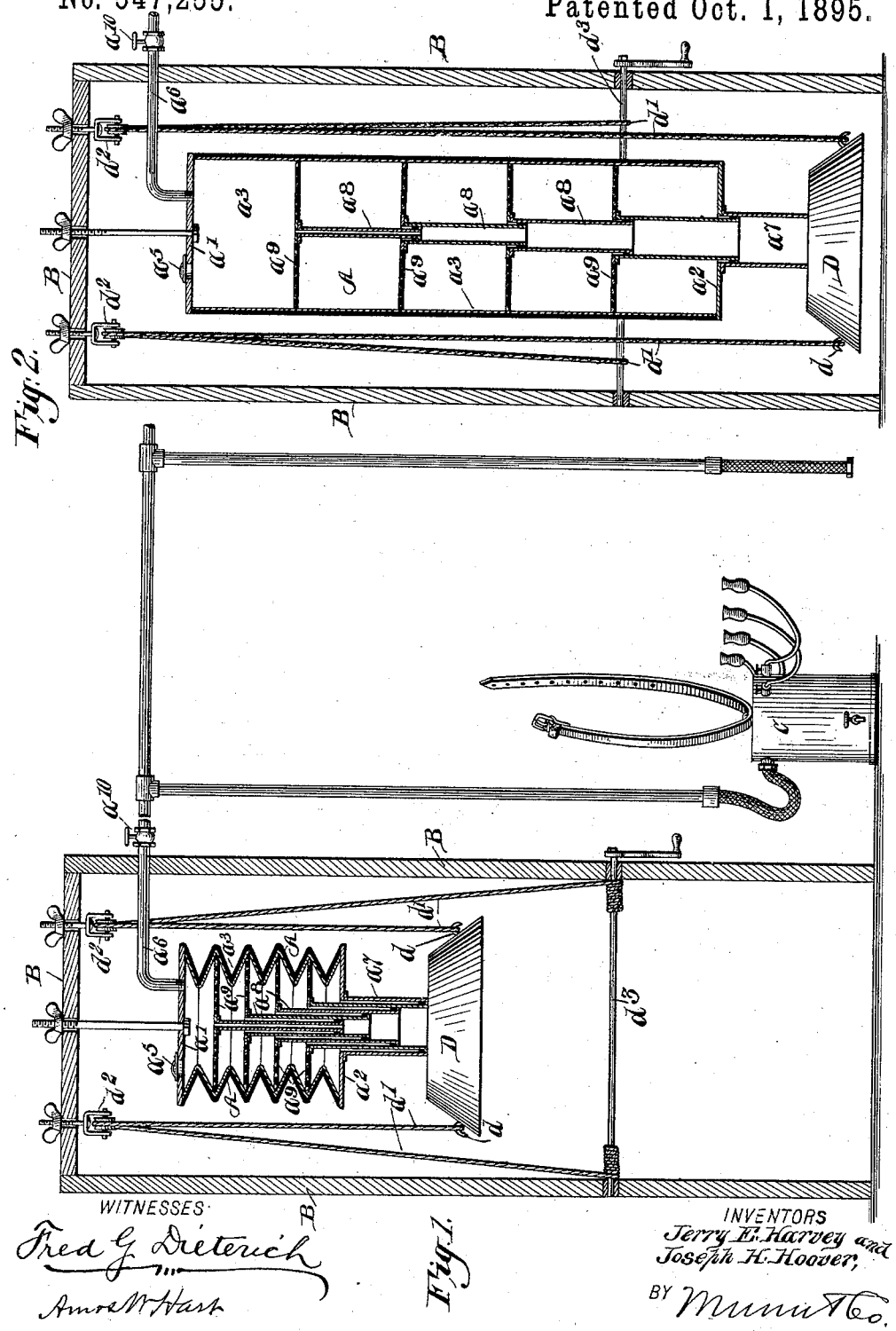

UNITED STATES PATENT OFFICE.

JERRY E. HARVEY AND JOSEPH H. HOOVER, OF HUBBARD, IOWA.

APPARATUS FOR MAINTAINING AND REGULATING VACUUMS IN COW-MILKING MACHINES.

SPECIFICATION forming part of Letters Patent No. 547,255, dated October 1, 1895.

Application filed March 12, 1895. Serial No. 541,458. (No model.)

*To all whom it may concern:*

Be it known that we, JERRY E. HARVEY and JOSEPH H. HOOVER, of Hubbard, in the county of Hardin and State of Iowa, have invented a new and Improved Apparatus for Maintaining and Regulating the Vacuum in Cow-Milking Machines, of which the following is a specification.

In so-called "vacuum" or "suction" cow-milking machines the effective result depends upon the intermittent action of a mechanical air-pump, and consequently the tension of the air or vacuum in the milk-receiver constantly varies within wide limits. It has, in fact, proven impossible to regulate the operation of the pump to the degree necessary to maintain an even approximately uniform vacuum or suction, since the inflow of milk into the receiver constantly takes the place of a larger or smaller volume of the rarefied air and thus changes the degree of expansion of the same.

We have devised and put into practical use an apparatus by which a practically uniform vacuum or practically uniform expansion and tension of the air may be maintained in the milk-receiver and its connections during the entire milking operation and that entirely irrespective of the quantity of milk drawn into the receiver.

Figure 1 is a vertical central section of the apparatus, showing the expansible air-exhaust chamber partly contracted. Fig. 2 is a similar section showing the said air-chamber fully expanded. Figs. 3 and 4 are sectional views of an expansible telescopic air-exhaust chamber of modified construction, one view showing it expanded and the other contracted or collapsed. Fig. 5 is a sectional view of another modified form of air-exhaust chamber. Fig. 6 is an exterior perspective view of a third modification or bellows type of the expansible air-exhaust chamber.

We will first describe the apparatus shown in Figs. 1 and 2 with the necessary detail, and then briefly refer to the several modifications.

The collapsible and expansible air-exhaust chamber A and its attachments embody the gist of our invention. It is suspended within the oblong vertical box or casing B (which might in a functional sense be a skeleton frame) by means of a rod attached to the top of such casing in any suitable manner. The air-chamber is formed, as to its exterior portion, of two rigid disk-like heads $a'$ $a^2$, made, preferably, of metal, and a collapsible air-tight tubular body $a^3$, whose ends are hermetically secured to such heads. The body $a^3$ is made, preferably, of rubber, lined interiorly with canvas to prevent stretching. The upper head $a'$ is imperforate, save that it is provided with an air-outlet valve $a^5$, and the exhaust-pipe $a^6$, that leads to the milk-receiver C, is rigidly secured to it. The lower head $a^2$ is, properly speaking, imperforate, but has a tubular downward extension $a^7$, whose lower end is closed by the weight D, attached to it, as shown.

Interiorly of the air-chamber A is a series of telescoping tubes $a^8$, arranged centrally and vertically and each rigidly attached to a supporting horizontal diaphragm $a^9$, which is perforated or skeleton-like, so that air may pass readily through it. The edges of the several diaphragms $a^9$ are attached to the inner sides of the tubular body $a^3$ of the air-chamber, and thus move up or down with it as it contracts or expands. The aforesaid weight D is provided with lateral hooks $d$, to which are attached ropes or cords $d$, that run on pulleys $d^2$ at the top of the casing $b$ and are connected with a crank-shaft $d^3$, journaled and arranged transversely in the lower portion of the casing B.

The operation of the apparatus is as follows: Before applying the teat-cups to the cow's udder the vacuum is created by closing valve $a^{10}$ in air-pipe $a^6$ and rotating the crank-shaft $d^3$, thus winding up the ropes $d'$ and raising the weight D, whereby the telescoping tubes $a^8$ are forced together, the diaphragms $a^9$ and heads $a'$ $a^2$ are approximated as closely as possible and the tubular body $a^3$ folded or collapsed, so that the contained air is expelled through the automatic check-valve $a^5$. The crank $d^3$ is then released and the weight D allowed to descend and the ropes $d'$ to unwind freely. The air-chamber is thus stretched or expanded, and there being no air-inlet such expansion proceeds until the vacuum or tension of the air within the chamber balances the weight proper D and the added weight of the portion of the air-chamber below the supported upper head $a'$. The parts are thus brought to rest, say in the expanded position shown in Fig. 1. In these up and down movements of the air-chamber proper it is apparent the telescoping tubes $a^8$ serve as guides for the diaphragms or stays $a^9$, and that the latter prevent entire lateral collapse of the body $a^3$, so that it collapses only at points between the diaphragms. The weight D at the lower head of the air-chamber A is so proportioned to other parts that the degree of suction or air-tension in the milk-receiver is exactly that desired and requisite to extract milk from the udder of the cow with due rapidity. The air-chamber A being thus held expanded, Fig. 1, the operator opens the stop-valve $a^{10}$, and the air contained in the pipe $a^6$, the milk-receiver, the teat-cups, and tubular connections between the latter and the receiver will be drawn into the chamber A, and a practically uniform degree of rarefaction or tension be produced within the entire apparatus. This access of air to the chamber will necessarily cause a slight further descent and expansion of the weighted air-chamber. The milk will at the same time begin to flow and take the place of a volume of the expanded or rarefied air equal to itself, and this will obviously allow a further and corresponding descent of the weight and expansion of the air-chamber, without, however, producing any change of air-tension or suction. In other words, the weight D applies a constant even pull and causes a uniform suction or vacuum in the entire apparatus, whatever be the quantity of rarefied air displaced by the milk drawn from the cow or cows. Thus the suction or vacuum is perfectly and automatically regulated during the entire milking operation, whether the air-chamber A be more or less expanded up to the point of maximum expansion of the latter. When the air-chamber has been fully expanded, the stop-valve $a^{10}$ is again closed, while the weight D is being again raised by the ropes $d'$ and crank-shaft $d^3$, and during this short time the expansion of the air in the pipe $a^6$, the milk-receiver, and its connections will cause sufficient suction to cause continuance of the flow of milk, although with somewhat reduced rapidity. The valve $a^5$ being then again opened the operation before described proceeds anew.

In the modification shown in Figs. 3 and 4 the collapsible air-exhaust chamber A' is formed solely of rigid tubular telescoping sections, whose construction and connection will be readily understood.

In Fig. 5 the air-chamber $A^2$ is a cylinder having a sliding piston, to whose rod a weight is attached. The piston-rod works in a guide, and the piston constitutes a movable portion of the chamber.

The modification shown in Fig. 6 is a bellows $A^3$, arranged horizontally, and has a weight suspended from its lower movable member or side.

The operation of these several modified forms of vacuum apparatus is obvious, and it is also equally clear that the effect produced by each is the same as that of the preferred form, of which a detailed description has been given, since in all of them the same method of producing a uniform air-exhaustion, corresponding exactly to the volume of rarefied air displaced by the varying quantity of milk drawn into the apparatus, is carried into practical effect.

The suction does not vary in any appreciable degree, but during the whole milking operation practically corresponds to the degree of vacuum created when the milking operation is begun. The displacement of air caused by the inflow of milk is really but a locus. In other words, the air-chamber is enlarged to correspond to the quantity of rarefied air forced into it by the inflow of milk.

What we claim is—

1. An apparatus for regulating the air tension or vacuum in a milking machine, which consists of an air-exhaust chamber having a movable portion, and means for automatically expanding said chamber as the air tension varies in the milk receiver tubes and air chamber with the inflow of milk, and a suitable tubular connection between such chamber and the receiver or teat cups substantially as shown and described.

2. An apparatus for regulating the air tension or vacuum in a milking machine, which consists of an air-exhaust chamber proper, a pendent weight attached to a movable side or member of such chamber, and a suitable tubular means for connecting such air chamber with the milk receiver or teat cups, substantially as shown and described.

3. An apparatus for regulating the air tension or vacuum in a milking machine, which consists of an expansible air-exhaust chamber proper, having an air escape valve, a pendent weight attached to the lower or movable side or member of such chamber, a milk receiver, a tubular connection between the latter and the air chamber, and means for raising the aforesaid weight and collapsing the air chamber, which means relax and play out automatically when tension is released, thus allowing the weight to descend and apply a constant and uniform pull on the movable side of the air chamber, whereby it is caused to instantly automatically adjust itself to the change of air tension produced by inflow of milk into the milk receiver, as specified.

4. An apparatus for regulating the air tension or vacuum in a milking machine, which consists of an expansible, air-exhaust chamber, having an automatic air-escape valve, and its lower side or member being movable, a weight pendent from such member, a milk receiver, and a tubular connection between the latter and the air chamber, and ropes and a winding device for raising the aforesaid weight and movable member of the air chamber, as shown and described.

5. An apparatus for regulating the air tension or vacuum in a milking machine, composed of an expansible air-exhaust chamber which is suspended at its upper side from a fixed support and has a flexible, collapsible body, a means for holding the latter expanded laterally, at one or more points, a weight connected with its lower end, for applying a constant stretch or tension to said air chamber, and a tube for connecting the latter with the milk receiver and teat cups as shown and described.

6. An apparatus for regulating the air tension or vacuum in a milking machine, composed of an air chamber having an air escape valve, rigid heads and a flexible collapsible tubular body which connects the latter, and forms an air tight inclosure, a series of rigid perforated diaphragms arranged within the air chamber parallel to the said heads, a series of telescoping guides connected with the diaphragms, a weight attached to the lower head, a tube for connecting the air chamber with a milk receiver and teat cups and means for raising said weight and collapsing the air chamber as specified.

JERRY E. HARVEY.
JOSEPH H. HOOVER.

Witnesses:
GEO. C. CABLE,
J. T. ELLIOTT.